(12) United States Patent
Kim

(10) Patent No.: US 7,494,290 B2
(45) Date of Patent: Feb. 24, 2009

(54) CAMERA WITH TRIPOD MOUNTING MECHANISM

(75) Inventor: Young-oog Kim, Seongnam-si (KR)

(73) Assignee: Samsung Techwin Co., Ltd., Changwon-city (KR)

( * ) Notice: Subject to any disclaimer, the term of this patent is extended or adjusted under 35 U.S.C. 154(b) by 322 days.

(21) Appl. No.: 11/584,712

(22) Filed: Oct. 19, 2006

(65) Prior Publication Data

US 2008/0019687 A1    Jan. 24, 2008

(30) Foreign Application Priority Data

Jul. 20, 2006    (KR) .................. 10-2006-0068093

(51) Int. Cl.
*G03B 17/00* (2006.01)
*G03B 17/02* (2006.01)
*F16M 11/04* (2006.01)

(52) U.S. Cl. .................. 396/419; 396/535; 248/187.1

(58) Field of Classification Search .................. 396/419, 396/533, 535; 248/177.1, 187.1, 188.4; 348/373–376
See application file for complete search history.

(56) References Cited

U.S. PATENT DOCUMENTS 5,666,582 A * 9/1997 Nakai et al. .................. 396/419
7,128,297 B2 * 10/2006 Lee .......................... 248/187.1

FOREIGN PATENT DOCUMENTS

JP    2002-006381 A    1/2002

* cited by examiner

*Primary Examiner*—W. B. Perkey
*Assistant Examiner*—Minh Phan
(74) *Attorney, Agent, or Firm*—Drinker Biddle & Reath LLP

(57) ABSTRACT

A slim camera which can be stably mounted on a tripod. The slim camera comprises a camera housing having a cavity in its bottom surface, and a tripod connecting element having a tripod connecting hole, the tripod connecting element being disposed in the cavity of the camera housing, which is movable so that the tripod connecting element can be moved between a retracted position where it does not extend outward from the housing, and an extended position where it does extend outward from the housing.

20 Claims, 5 Drawing Sheets

CAMERA WITH TRIPOD MOUNTING MECHANISM

CROSS-REFERENCE TO RELATED PATENT APPLICATIONS

This application claims the benefit of Korean Patent Application No. 10-2006-0068093, filed on Jul. 20, 2006, in the Korean Intellectual Property Office, the disclosure of which incorporated herein in its entirety by reference.

BACKGROUND OF THE INVENTION

1. Field of the Invention

The present invention relates to a slim camera, and more particularly, to a slim camera which can be stably mounted on a tripod.

2. Description of the Related Art

As the demand for slim cameras has increased, cameras have become smaller and more compact. However, even a camera employing a slim design should have certain fundamental functions, such as the ability to be stably mounted on a tripod.

FIG. 1 is a schematic perspective view of a conventional camera 10 and a tripod 20. Referring to FIG. 1, a tripod connecting hole is formed in a bottom surface of the camera 10 and a mounting screw 21 of the tripod 20 is inserted into the tripod connecting hole so that the camera 10 is mounted on the tripod 20.

FIG. 2 is a schematic cross-sectional view of a lower portion of the camera illustrated in FIG. 1, and FIG. 3 is a schematic partial cross-sectional view of a connected portion in which the camera 10 is mounted on the tripod 20.

Referring to FIGS. 2 and 3, a tripod connecting hole 12 is formed in a bottom surface of a housing 11 of the camera 10, and a mounting screw 21 of the tripod 20 is inserted into the tripod connecting hole 12 so that the camera 10 is mounted on the tripod 20. In this case, a length $l_{12}$ of the tripod connecting hole 12 formed in the housing 11 of the camera 10 is substantially the same as a length $l_{21}$, of the mounting screw 21 of the tripod 20. Thus, a thickness $d_{11}$, of the housing 11 is at least larger than the length $l_{12}$ of the tripod connecting hole 12, and therefore also longer than the length $l_{21}$ of the mounting screw 21 of the tripod 20. As a result, the thickness of the case 11 is increased, resulting in hindering the implementation of a slim camera.

A lower portion of the camera illustrated in FIGS. 2 and 3 may be the same structure as that of a lower portion of another conventional camera illustrated in FIG. 4 so that the thickness $d_{11}$ of the housing 11 can be reduced. Even in such a case, a portion, with which the mounting screw of the tripod is combined and in which the tripod connecting hole 12 is formed, is indented into the camera 10, resulting in the housing 11 having a thickness $d_{10}$ so as to provide the length $l_{12}$ of the tripod connecting hole 12 corresponding to the mounting screw. Thus, as the internal volume of the camera 10 is increased, it is not easy to implement a slim camera.

A method for reducing the size of a mounting screw of a tripod has been proposed so as to overcome the problem. In this case, the internationally standardized tripod cannot be used. In addition, a structure has been proposed, in which only a small-sized connecting hole is provided in the camera housing, and an auxiliary adaptor is combined with the small-sized connecting hole of the camera and the mounting screw of the tripod is inserted into the sufficiently sized tripod connecting hole of the auxiliary adaptor. Alternatively, a structure has been proposed, in which the camera is supported by a clip support implement and the mounting screw of the tripod is inserted into a tripod connecting hole formed in the clip support implement. However, in this case, an additional auxiliary adaptor or clip support implement needs to be carried in order to mount on the tripod.

SUMMARY OF THE INVENTION

The present invention provides a slim camera which can be stably mounted on a tripod.

According to an embodiment of the present invention, there is provided a camera, the camera including: a camera housing having a cavity in its bottom surface; and a tripod connecting element having a tripod connecting hole, the tripod connecting element being generally disposed in the cavity of the camera housing, the tripod connecting element being movable between a retracted position where the connecting element is disconnected from the tripod mounting screw and is substantially retained within the cavity, and an extended position where the connecting element is connected to the tripod mounting screw and extends at least partially outward from the bottom surface of the camera housing.

A shoulder for retaining the tripod connecting element while extended may be formed in the cavity of the camera housing.

The tripod connecting element may include a base member and a protrusion member protruding from the base member. When in the extended position, the protrusion member protrudes outward from the bottom surface of the camera housing, an edge of the base member contacts the shoulder of the cavity of the camera housing.

The tripod connecting element may include a tripod connecting hole therein. The tripod connecting hole may extend within the base member and the protrusion member of the tripod connecting element.

The base member of the tripod connecting element may be polygonal in shape.

The tripod connecting element may be movable in a direction generally parallel to the axis of the tripod connecting hole.

The length of the tripod connecting hole of the tripod connecting element may be shorter than the length of a mounting screw of a tripod upon which the camera will be mounted.

The tripod connecting element may protrude outward from the bottom surface of the camera housing when it is mounted on the mounting screw of a tripod and in the extended position, and the tripod connecting element retained within the cavity when it is not mounted on the tripod and maintains a retracted position.

The camera may further include an elastic member the urges the tripod connecting element to its retracted position when it is not mounted on a tripod. The elastic member may be a spring.

DETAILED DESCRIPTION OF THE INVENTION

Hereinafter, the present invention will be described in detail by explaining exemplary embodiments of the invention with reference to the attached drawings.

Figure 5:
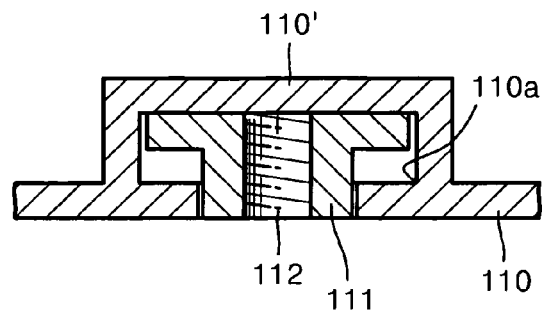
FIG. 5 is a cross-sectional view of a lower portion of a camera according to an embodiment of the present invention.
Figure 6:
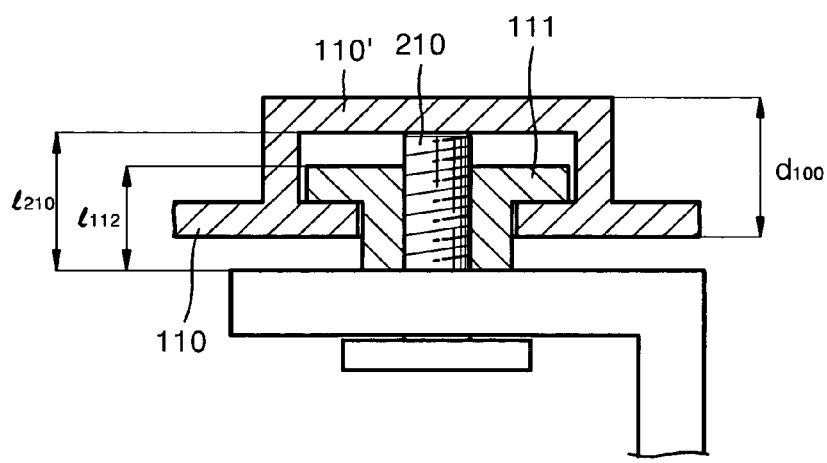
FIG. 6 is a cross-sectional view of a connected portion in which the camera and the tripod illustrated in FIG. 5 are combined with each other.
Figure 7:
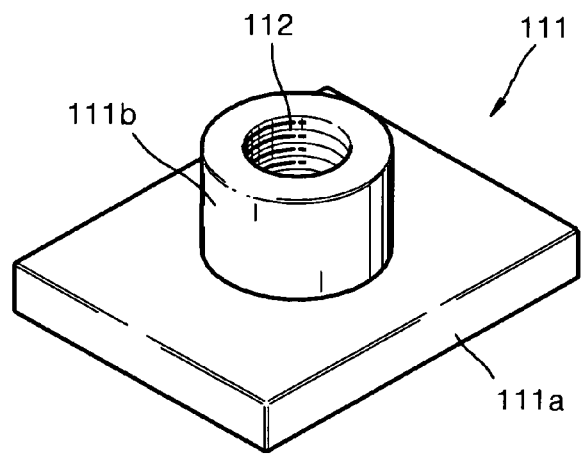
FIG. 7 is a perspective view of a tripod connecting element included in the camera illustrated in FIG. 5.

FIG. 5 is a cross-sectional view of a lower portion of a camera according to an embodiment of the present invention, FIG. 6 is a schematic cross-sectional view of a connected portion in which the camera illustrated in FIG. 5 is mounted on a tripod, and FIG. 7 is a perspective view of a tripod connecting element of the camera illustrated in FIG. 5.

Referring to FIGS. 5 through 7, the camera includes a camera housing 110. A cavity is formed in a bottom surface of the camera housing 110. In the drawings, a portion of the camera housing forms the cavity which defines an opening on the bottom surface of the camera housing 110.

The camera further includes a tripod connecting element 111. The tripod connecting element 111 is disposed generally inside the cavity of the camera housing 110. The tripod connecting element 111 is movable. As shown in FIG. 5, the tripod connecting element 111 may be moved into a retracted position where the tripod connecting element does not extend outward from the bottom surface of the camera housing 110. In another embodiment, as shown in FIG. 6, the tripod connecting element 111 may be moved into an extended position where a portion of the tripod connecting element 111 extends outward from the bottom surface of the camera housing 110. The tripod connecting element 111 may have a tripod connecting hole 112. A mounting element 210 of a tripod (in some embodiments the mounting element of a tripod is a screw), may be inserted into the tripod connecting hole 112 so that the camera can be mounted onto the tripod.

In this embodiment, a shoulder 110a of the camera housing 110 retains the tripod connecting element 111 within the cavity when the tripod connecting element is moved to its extended position. Referring to FIG. 7, the tripod connecting element 111 includes a base member 111a and a protrusion member 111b protruding from the base member 111a. A portion of the protrusion member 111b of the tripod connecting element 111 protrudes outward from the bottom surface of the camera housing 110, as shown in FIG. 6, an edge of the base member 111a of the tripod connecting element 111 contacts the shoulder 110a of the cavity of the camera housing 110 so that the tripod connecting element 11 is prevented from being separated from the camera housing 110. The tripod connecting element 111 of the camera does not need to have the shape as shown in FIG. 7 and may be modified in a variety of ways.

The base member 111a of the tripod connecting element 111 may be polygonal such as the rectangular tripod connecting element shown in FIG. 7. As shown in FIG. 6, the tripod connecting element 111 does not rotate when the camera is mounted onto the tripod so that the camera and the tripod can easily move with each other.

The tripod connecting hole 112 of the tripod connecting element 111 is formed so as to penetrate the tripod connecting element 111. When the tripod connecting element 111 includes the base member 111a and the protrusion member 111b protruding from the base member 111a, the tripod connecting hole 112 of the tripod connecting element 111 is formed so as to penetrate the base member 111a and the protrusion member 111b.

In one embodiment, as shown in FIG. 5, the tripod connecting element 111 is in a retracted position and is generally completed retained within the cavity of the camera housing 110. The tripod connecting element 111 is movable in a direction generally parallel to the axis of the tripod connecting hole 112. Thus, when the camera is mounted onto the tripod, as shown in FIG. 6, a portion of the tripod connecting element 111 extends outward from the bottom surface of the camera housing 110.

In this embodiment, the tripod connecting element 111 protrudes outward from the bottom surface of the camera housing 110 when the mounting screw 210 of the tripod is inserted into the tripod connecting hole 112 of the tripod connecting element 111. Thus, a more compact slim camera compared to the prior art can be implemented.

Figure 4:
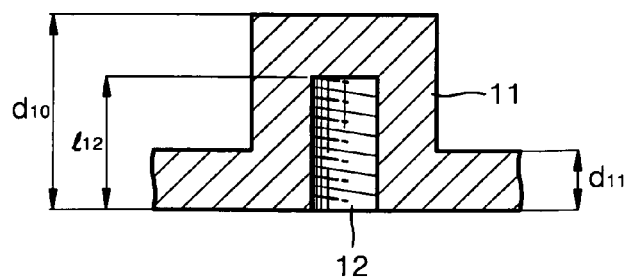
FIG. 4 is a cross-sectional view of a lower portion of another conventional camera.

Unlike the dimensions of the conventional camera, in the case of the camera according to an embodiment of the present invention, the length $l_{112}$ of the tripod connecting hole 112 of the tripod connecting element 111 is shorter than the length $l_{210}$ of the mounting screw 210 of a tripod upon which the camera is to be mounted. This is because a portion of the tripod connecting element 111 protrudes outward from the bottom surface of the camera housing 110 when the camera is mounted onto the tripod, as illustrated in FIG. 6. Thus, the thickness $d_{100}$ of the space required for the tripod connecting element 111 inside the cavity of the camera housing 110 may be remarkably reduced compared to the thickness $d_{10}$ of the conventional camera illustrated in FIG. 4. Thus, the invention provides a slim camera which can be stably mounted on a tripod and whose size may be remarkably reduced compared to that of a conventional camera.

Figure 8:
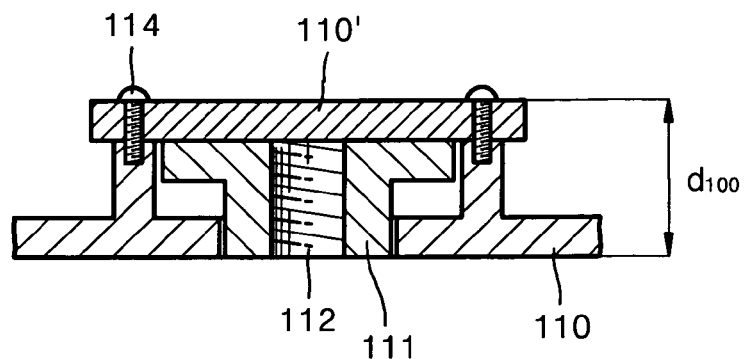
FIG. 8 is a cross-sectional view of a lower portion of a camera according to another embodiment of the present invention.

The tripod connecting element 111 of the invention may be implemented in a variety of different ways and different embodiments. For example, a member 110' which define the bottom of the cavity may be formed as an additional element, as illustrated in FIG. 8, and the member 110' may attached to the camera housing 110 using a screw 114. In this case, a thickness $d_{100}$ of the space required for the tripod connecting element 111 inside the bottom surface of the camera housing 110 may be remarkably reduced compared to the thickness $d_{10}$ of the conventional camera illustrated in FIG. 4.

Figure 1:
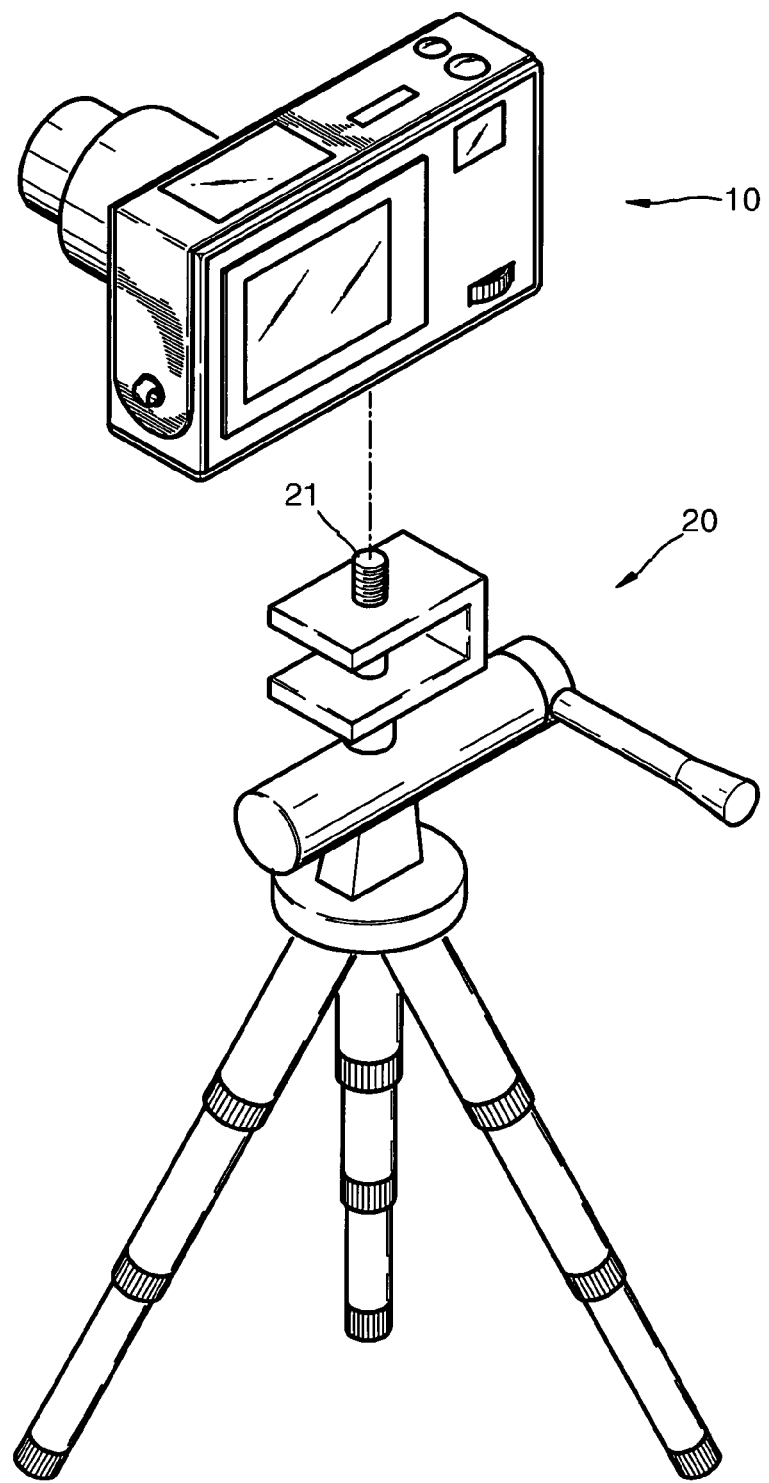
FIG. 1 is a perspective view of a conventional camera and tripod.
Figure 2:
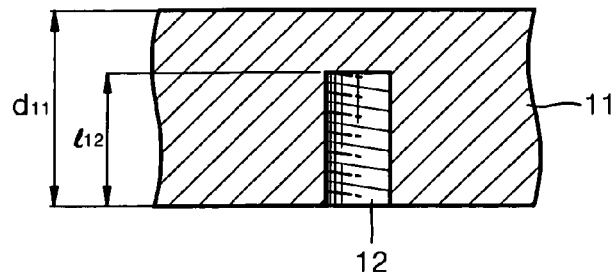
FIG. 2 is a cross-sectional view of a lower portion of the camera illustrated in FIG. 1.
Figure 3:
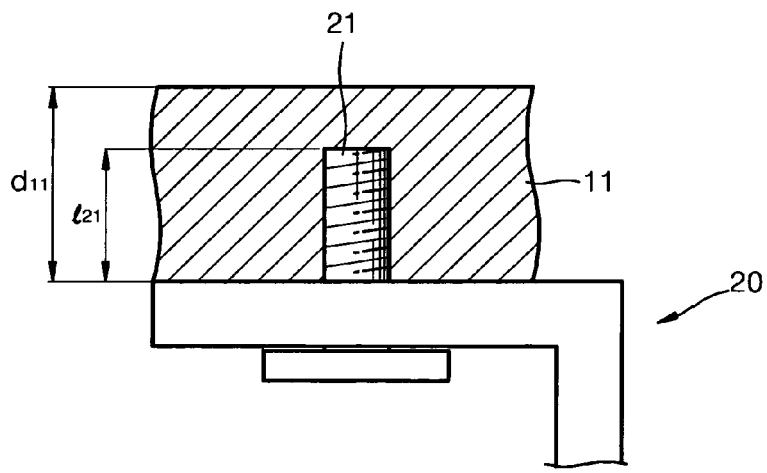
FIG. 3 is a partial cross-sectional view of a connected portion in which the camera and the tripod illustrated in FIG. 1 are combined with each other.
Figure 9:
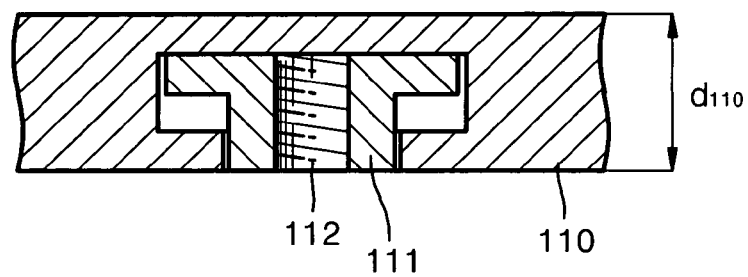
FIG. 9 is a cross-sectional view of a lower portion of a camera according to another embodiment of the present invention.

In another embodiment, the cavity may be formed in the camera housing and the tripod connecting element 111 may be disposed in the cavity, as illustrated in FIG. 9. In this case, the thickness $d_{110}$ of the space required for the tripod connecting element 111 inside the bottom surface of the camera housing 110 may be remarkably reduced compared to the thickness $d_{11}$ of the conventional camera illustrated in FIG. 2 or 3. Thus, the invention provides a slim camera which can be stably mounted on a tripod and whose size may be remarkably reduced compared to that of a conventional camera.

Figure 10:
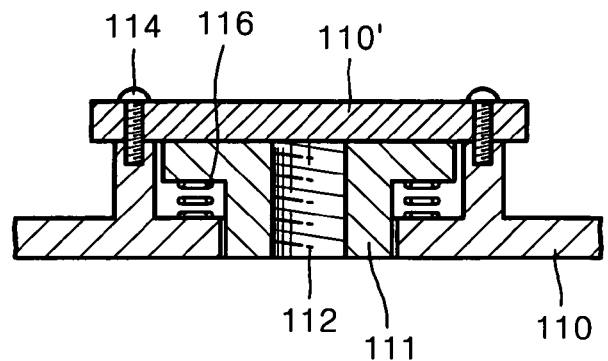
FIG. 10 is a cross-sectional view of a lower portion of a camera according to another embodiment of the present invention.

FIG. 10 is a cross-sectional view of a lower portion of a camera according to another embodiment of the present invention.

As illustrated in the above-described embodiments of the present invention, unlike the conventional camera, a portion of a tripod connecting element extends outward from a bottom surface of the camera housing when the camera is mounted onto a tripod. Thus, when the camera is not mounted onto a tripod, the tripod connecting element does not protrude outward from the bottom surface of the camera housing.

Figure 11:
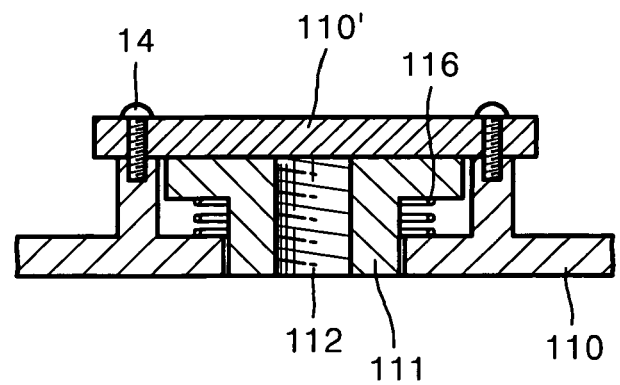
FIG. 11 is a cross-sectional view of a lower portion of a camera according to another embodiment of the present invention.

To this end, the camera of FIG. 10 illustrates that the invention may also include an elastic member 116 that urges the tripod connecting element 111 into a retracted position in the cavity when the tripod connecting element 111 is not mounted on the tripod. The elastic member 116 may be a spring but is not limited thereto and may also be any other type of elastic or resilient element. In FIG. 10, the elastic member 116 is a coil spring. FIG. 10 illustrates the case where two coil springs are used as the elastic member 116. However, a variety of embodiments are possible, for example, three or more coil springs may be used as the elastic member 116. Of course, even when the coil spring is used as the elastic member 116, one coil spring may be used, as illustrated in FIG. 11. In this case, a variety of embodiments are possible, for example, the coil spring 116 may surround the protrusion member of the tripod connecting element 111. In such an arrangement, the axis of the coil spring 116 may be positioned generally parallel to the axis of the tripod connecting hole 112 of the tripod connecting element 111.

Figure 12:
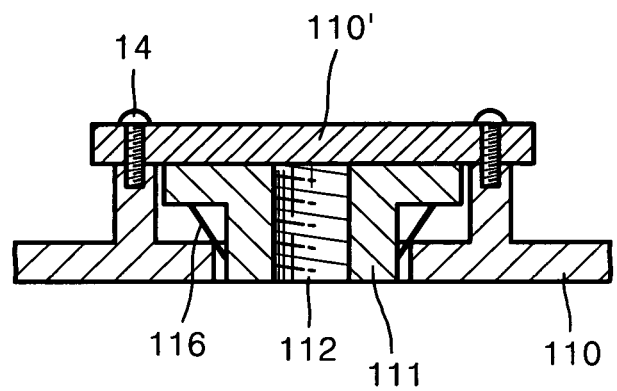
FIGS. 12 and 13 are respectively schematic cross-sectional views of lower portions of cameras according to other embodiments of the present invention.
Figure 13:
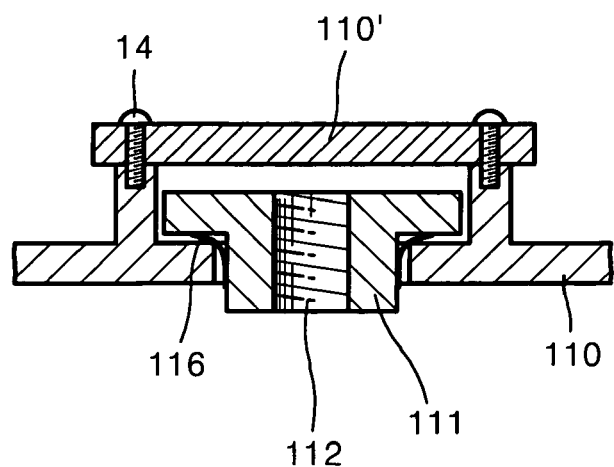

FIGS. 12 and 13 are cross-sectional views of a lower portion of camera according to another embodiment of the present invention where a leaf spring is used as the elastic member 116. As illustrated in FIG. 12, when the camera is disconnected from the tripod, the tripod connecting element 111 may be substantially completely retained within the cavity of the camera housing 110 because the leaf spring 116 urges the connecting element 111 into that position. As illustrated in FIG. 13, when the camera is mounted on the tripod, the tripod connecting element 111 may extend at least partially outward from the bottom surface of the camera housing 110. In FIGS. 12 and 13, the leaf spring is disposed over a base member and a protrusion member of the tripod connecting element 111. However, a variety of embodiments are possible, for example, the leaf spring may be disposed over a shoulder (see 110a of FIG. 5) of the camera housing 110.

As described above, the present invention provides a slim camera which can be stably mounted on a tripod.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A camera comprising:
   a camera housing having a cavity in its bottom surface; and
   a tripod connecting element having a tripod connecting hole, the tripod connecting element being disposed in the cavity of the housing, the tripod connecting element being movable between a retracted position where the connecting element is substantially retained within the cavity and an extended position where the connecting element at least partially extends outward from the housing.

2. The camera of claim 1, wherein a shoulder is formed in the cavity to prevent the tripod connecting element from being separated from the camera.

3. The camera of claim 2, wherein the tripod connecting element comprises:
   a base member; and
   a protrusion member protruding from the base member,
   wherein, when the protrusion member extends outward from the bottom surface of the camera housing, an edge of the base member contacts the shoulder of the cavity of the camera housing.

4. The camera of claim 3, wherein the tripod connecting hole of the tripod connecting element is formed so as to penetrate the base member and the protrusion of the tripod connecting element.

5. The camera of claim 3, wherein the base member of the tripod connecting element is polygonal.

6. The camera of claim 1, wherein the tripod connecting hole of the tripod connecting element is formed so as to penetrate the tripod connecting element.

7. The camera of claim 6, wherein the tripod connecting element is movable in a direction generally parallel to the axis of the connecting hole.

8. The camera of claim 6, wherein the length of the tripod connecting hole is shorter than the length of a mounting element of a tripod onto which the camera is to be mounted.

9. The camera of claim 1, wherein the tripod connecting element extends at least partially outward from the bottom surface of the camera housing when it is mounted onto a tripod, and the tripod connecting element does not extend outward from the bottom surface of the camera housing when it is not mounted a tripod.

10. The camera of claim 1, wherein the tripod connecting hole is threaded to accommodate a screw.

11. The camera of claim 9, further comprising an elastic member that urges the tripod connecting element into the cavity when not coupled with a mounting element of a tripod.

12. The camera of claim 11, wherein the elastic member is a spring.

13. The camera of claim 11, wherein the elastic member is a plurality of springs.

14. A camera comprising:
   a camera housing having a cavity in its bottom surface;
   a tripod connecting element having a tripod connecting hole, the tripod connecting element being disposed in cavity of the camera housing, the tripod connecting element being movable between a retracted position where the connecting element does not extend outward from the housing, and an extended position where the connecting element extends at least partially outward from the housing; and
   a shoulder formed in the cavity of the camera housing to contain the tripod connecting element in the cavity,
   wherein the tripod connecting element comprises:
      a base member; and
      a protrusion member protruding from the base member,
      wherein, when the protrusion member of the tripod connecting element extends outward from the bottom surface of the camera housing, an edge of the base member of the tripod connecting element contacts the shoulder of the cavity of the camera housing.

15. The camera of claim 14, wherein the tripod connecting element extends outwards from the bottom surface of the camera housing when it is mounted onto the mounting element of a tripod, and the tripod connecting element does not extend outward from the bottom surface of the camera housing when it is not mounted onto the mounting element of a tripod.

16. The camera of claim 15, wherein the tripod connecting hole is formed so as to penetrate the base member and the protrusion of the tripod connecting element.

17. The camera of claim 16, further comprising an elastic member urging the tripod connecting element toward the retracted position.

18. A camera comprising:
- a camera housing having a cavity on its bottom surface;
- a tripod connecting element comprising a tripod connecting hole, the tripod connecting element being disposed in the cavity of the camera housing, the tripod connecting element being movable so that the tripod connecting element extends outwards from the bottom surface of the camera housing when it is mounted onto the mounting element of a tripod, and the tripod connecting element does not extend outward from the housing when it is not mounted onto the mounting element of a tripod;
- an elastic member preventing the tripod connecting element from extending outward from the bottom surface of the camera housing when the tripod connecting element is not coupled with a mounting element of the tripod; and
- a shoulder formed in the cavity of the camera housing to contain the tripod connecting element in the cavity, wherein the tripod connecting element comprises:
- a base member; and
- a protrusion protruding from the base member,
- wherein, when the protrusion of the tripod connecting element extends outward from the bottom surface of the camera housing, an edge of the base member of the tripod connecting element contacts the shoulder of the cavity of the camera housing; and further comprising a tripod connecting hole that is formed so as to penetrate the base member and the protrusion of the tripod connecting element.

19. The camera of claim 18, wherein the mounting element of a tripod is a screw.

20. The camera of claim 19, wherein the tripod connecting hole is threaded.

* * * * *